United States Patent
Roehm et al.

(10) Patent No.: US 10,364,737 B2
(45) Date of Patent: Jul. 30, 2019

(54) COOLING SYSTEM FOR A VEHICLE

(71) Applicant: Dr. Ing. h.c. F. Porsche Aktiengesellschaft, Stuttgart (DE)

(72) Inventors: Heiko Roehm, Kernen (DE); Miroslaw Oslislok, Leonberg (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 188 days.

(21) Appl. No.: 15/150,572

(22) Filed: May 10, 2016

(65) Prior Publication Data
US 2017/0016383 A1    Jan. 19, 2017

(30) Foreign Application Priority Data
Jul. 14, 2015    (DE) .......................... 10 2015 111 407

(51) Int. Cl.
*F01P 11/02*    (2006.01)
*F01P 3/20*    (2006.01)
(Continued)

(52) U.S. Cl.
CPC .............. *F01P 11/0285* (2013.01); *F01P 3/20* (2013.01); *F02B 37/00* (2013.01); *F02B 39/005* (2013.01);
(Continued)

(58) Field of Classification Search
CPC .. F01P 11/0285; F01P 3/12; F01P 3/20; F01P 2060/12; F02M 35/10157; F02M 35/10268; F02B 39/005; F02B 37/00; Y02T 10/144
(Continued)

(56) References Cited

U.S. PATENT DOCUMENTS

| | | | | |
|---|---|---|---|---|
| 4,061,187 A | * | 12/1977 | Rajasekaran | ............. F01P 3/20 123/41.29 |
| 2003/0127528 A1 | | 7/2003 | Sabhapathy et al. | |

(Continued)

FOREIGN PATENT DOCUMENTS

| DE | 2 063 298 | 7/1972 |
|---|---|---|
| DE | 198 5444 | 6/2000 |

(Continued)

OTHER PUBLICATIONS

English Translation of JP 2013238121 A.*
Japanese Office Action dated May 29, 2017.
German Search Report dated Mar. 8, 2016.

*Primary Examiner* — Jason D Shanske
*Assistant Examiner* — Jessica L Kebea
(74) *Attorney, Agent, or Firm* — Gerald E. Hespos; Michael J. Porco; Matthew T. Hespos

(57) ABSTRACT

A cooling system (10) for a vehicle has a high temperature cooling circuit (11) for cooling a drive assembly (13) and an exhaust gas turbocharger (14) and has a low temperature cooling circuit (12) for cooling a charge air cooler (19). The high temperature cooling circuit (11) and the low temperature cooling circuit (12) are coupled via a coupling line (25), into which a nonreturn valve (26) is connected. The nonreturn valve (26) is opened or closed depending on the pressure ratio between the high temperature cooling circuit (11) and the low temperature cooling circuit (12). The high temperature cooling circuit (11) and the low temperature cooling circuit (12) can be vented via a common cooling water compensation tank (21) only in defined operating states when the nonreturn valve (26) of the coupling line (25) is open.

5 Claims, 1 Drawing Sheet

(51) Int. Cl.
*F02B 37/00* (2006.01)
*F02B 39/00* (2006.01)
*F02M 35/10* (2006.01)
*F01P 3/12* (2006.01)
*F01P 7/14* (2006.01)

(52) U.S. Cl.
CPC ............... *F02M 35/10157* (2013.01); *F02M 35/10268* (2013.01); *F01P 2060/12* (2013.01); *Y02T 10/144* (2013.01)

(58) Field of Classification Search
USPC ........................................................ 60/605.3
See application file for complete search history.

(56) References Cited

U.S. PATENT DOCUMENTS

| | | | | |
|---|---|---|---|---|
| 2006/0213459 | A1* | 9/2006 | Theorell | F01P 3/2207 123/41.02 |
| 2009/0229542 | A1* | 9/2009 | Haas | F01P 7/165 123/41.1 |
| 2012/0006286 | A1 | 1/2012 | Brinkmann et al. | |
| 2012/0234266 | A1* | 9/2012 | Faulkner | F01P 3/12 123/41.1 |
| 2013/0333643 | A1* | 12/2013 | Kaulen | F01P 7/14 123/41.08 |
| 2015/0047340 | A1* | 2/2015 | Ulrey | F02B 47/08 60/600 |
| 2016/0305306 | A1* | 10/2016 | Oslislok | F01P 7/165 |
| 2016/0325601 | A1* | 11/2016 | Richter | F01P 11/08 |
| 2017/0204776 | A1* | 7/2017 | Markin | F01P 11/0285 |
| 2017/0248065 | A1* | 8/2017 | Liu | F01P 5/12 |

FOREIGN PATENT DOCUMENTS

| | | | | |
|---|---|---|---|---|
| DE | 103 00 294 | | 7/2003 | |
| DE | 2006-02-09 | | 2/2006 | |
| DE | 102004021551 | A1 * | 2/2006 | ............. F01P 7/165 |
| DE | 102006020951 | A1 * | 2/2007 | ............. F01P 7/165 |
| DE | 10 2007 061 495 | | 6/2009 | |
| DE | 10 2009 051 377 | | 5/2011 | |
| DE | 10 2010 017 766 | | 1/2012 | |
| DE | 10 2011 114 308 | | 3/2013 | |
| DE | 102016118498 | A1 * | 6/2017 | ............. B60K 11/02 |
| EP | 1283334 | A1 * | 2/2003 | ............. F01P 7/165 |
| EP | 1832730 | A2 * | 9/2007 | ................ F01P 3/12 |
| JP | 2013238121 | A * | 11/2013 | |
| JP | 2014005815 | A | 1/2014 | |
| WO | WO 8000863 | A1 * | 5/1980 | ................ F01P 3/20 |
| WO | 03/042516 | | 5/2003 | |

\* cited by examiner

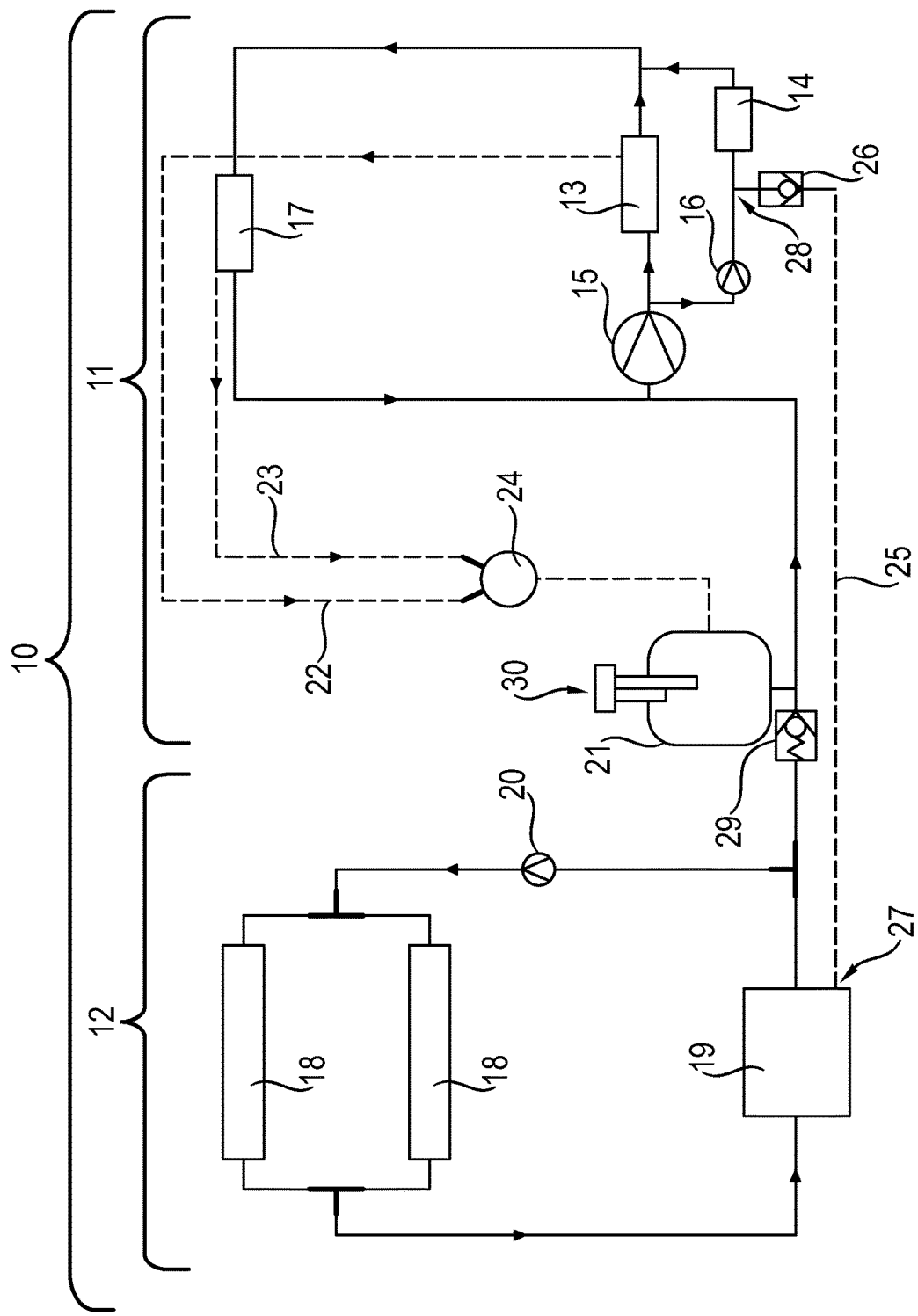

COOLING SYSTEM FOR A VEHICLE

CROSS REFERENCE TO RELATED APPLICATION

This application claims priority under 35 USC 119 to German Patent Appl. No. 10 2015 111 407.0 filed on Jul. 14, 2015, the entire disclosure of which is incorporated herein by reference.

BACKGROUND

1. Field of the Invention

The invention relates to a cooling system for a vehicle.

2. Description of the Related Art

Vehicles have cooling systems to cool components of the vehicle. It is known from practice that a cooling system for a vehicle with a drive assembly charged by exhaust gas, may comprise a high temperature cooling circuit and a low temperature cooling circuit. The high temperature cooling circuit cools the drive assembly and the exhaust gas turbocharger, whereas the low temperature cooling circuit cools a charge air cooler and therefore for the charge air.

The high temperature cooling circuit and the low temperature cooling circuit are separated from each other and can be vented separately via separate cooling water compensation tanks. The high temperature cooling circuit can be decoupled thermally from the low temperature cooling circuit to ensure a high degree of efficiency of the cooling circuits. However, the separate cooling water compensation tanks bring about a relatively complex construction of the cooling system.

DE 10 2007 061 495 A1 discloses a cooling system for a vehicle with a high temperature cooling circuit and a low temperature cooling circuit. According to this prior art, separate compensation tanks can be provided for both cooling circuits, or alternatively, a common compensation tank can be provided for both cooling circuits for venting the cooling circuits.

If there is a common compensation tank is provided for both cooling circuits of the system disclosed in DE 10 2007 061 495 A1, there is the risk of the coolant flowing out of the high temperature cooling circuit into the low temperature cooling circuit, thereby limiting the efficiency of the cooling system is limited.

It is an object of the invention to provide a novel cooling system for a vehicle having a high degree of efficiency and a simpler construction.

SUMMARY

The invention relates to a cooling system with a high temperature cooling circuit and a low temperature cooling circuit that are coupled via a coupling line, into which a nonreturn valve is connected. The nonreturn valve is opened or closed depending on the pressure ratio between the high temperature cooling circuit of the cooling system and the low temperature cooling circuit of the cooling system. According to the invention, the high temperature cooling circuit of the cooling system and the low temperature cooling circuit of the cooling system can be vented via a common cooling water compensation tank. The high temperature cooling circuit can be vented via the cooling water compensation tank that is connected into the high temperature cooling circuit, and the low temperature cooling circuit can be vented into the high temperature cooling circuit and via the cooling water compensation tank only in defined operating states when the nonreturn valve is open.

The use of a common cooling water compensation tank for the high temperature cooling circuit and the low temperature cooling circuit permits effective cooling of vehicle assemblies with little requirement for construction space and a simple construction of the cooling system. The high temperature cooling circuit and the low temperature cooling circuit are coupled via the coupling line to the nonreturn valve. The cooling water compensation tank is integrated in the high temperature cooling circuit, and therefore the high temperature cooling circuit can be vented via the cooling water compensation tank. The low temperature cooling circuit can be vented via the cooling water compensation tank of the high temperature cooling circuit, but only in defined, noncritical operating states, namely when the nonreturn valve is open, i.e. in the event of the defined pressure ratios between the high temperature cooling circuit and the low temperature cooling circuit.

The nonreturn valve of the coupling line may be closed to separate the high temperature cooling circuit and the low temperature cooling circuit whenever the rotational speed of the high temperature cooling water pump and/or the rotational speed of the exhaust gas turbocharger after run pump are/is greater than a limit value.

The nonreturn valve of the coupling line may be opened to vent the low temperature cooling circuit of the cooling system whenever the rotational speed of the high temperature cooling water pump and/or the rotational speed of the exhaust gas turbocharger after run pump are/is lower than a limit value.

Whenever, at a high rotational speed of the drive assembly, the rotational speed of the high temperature cooling water pump is high, and/or whenever the rotational speed of the actively drivable exhaust gas turbocharger after run pump is high, the nonreturn valve is closed and no venting of the low temperature cooling circuit into the high temperature cooling circuit is possible. Venting of the low temperature cooling circuit into the cooling water compensation tank integrated in the high temperature cooling circuit takes place only during noncritical operating states of the vehicle, such as when the rotational speed of the high temperature cooling water pump and the rotational speed of the exhaust gas turbocharger after run pump are lower than limit values.

The low temperature cooling circuit may comprise at least one low temperature cooler around which air flows and through which cooling water flows, the charge air cooler that can be cooled via the cooling water of the low temperature cooling circuit, and a low temperature cooling water pump. The high temperature cooling circuit may comprises at least one high temperature cooler around which air flows and through which cooling water flows, the drive assembly that can be cooled via the cooling water of the high temperature cooling circuit, the exhaust gas turbocharger that can be cooled via the cooling water of the high temperature cooling circuit, a high temperature cooling water pump and an exhaust gas turbocharger after run pump. A first end of the coupling line may engage the charge air cooler of the low temperature cooling circuit of the cooling system and a second end thereof may engage the high temperature cooling circuit of the cooling system downstream of the exhaust gas turbocharger after run pump. This connection of the coupling line is particularly advantageous for ensuring a simple construction of the cooling system and for ensuring a high degree of efficiency of the cooling system.

Exemplary embodiments of the invention are explained in more detail, without being restricted thereto, with reference to the drawing.

BRIEF DESCRIPTION OF THE DRAWINGS

FIG. 1 is a block circuit diagram of a cooling system of a vehicle according to the invention.

DETAILED DESCRIPTION

FIG. 1 is a block circuit diagram of a cooling system 10 for a vehicle according to the invention. The cooling system 10 comprises a high temperature cooling circuit 11 and a low temperature cooling circuit 12.

The high temperature cooling circuit 11 of the cooling system 10 cools a drive assembly 13 and an exhaust gas turbocharger 14. The drive assembly 13 is an internal combustion engine that is associated with the exhaust gas turbocharger 14 in a known manner. The high temperature cooling circuit 11 comprises a high temperature cooling circuit pump 15 to supply the assemblies that are to be cooled via the high temperature cooling circuit 11 with cooling water. The rotational speed of the pump 15 is dependent on the rotational speed of the drive assembly 13. The high temperature cooling circuit 11 also comprises an exhaust gas turbocharger after run pump 16, the rotational speed of which can be adjusted independently of the rotational speed of the drive assembly 13. Accordingly, cooling water required for cooling the drive assembly 13 and the exhaust gas turbocharger 14 can be circulated with the aid of the pumps 15, 16 of the high temperature cooling circuit 11 and can be conducted via at least one high temperature cooler 17. The cooling water of the high temperature cooling circuit 11 flows through the high temperature cooler 17 and air flows around the high temperature cooler 17.

The low temperature cooling circuit 12 of the cooling system 10 comprises at least one low temperature cooler 18 through which cooling water of the low temperature cooling circuit 12 flows and around which air flows. The cooling water of the low temperature cooling circuit 12 can be conducted via a charge air cooler 19 of the low temperature cooling circuit 12 to cool charge air of the exhaust gas turbocharger. The cooling water is circulated within the low temperature cooling circuit 12 by a low temperature cooling water pump 20 of the low temperature cooling circuit 12.

A common cooling water compensation tank 21 interacts with the high temperature cooling circuit 11 and the low temperature cooling circuit 12. The cooling water compensation tank 21 is integrated in the high temperature cooling circuit 11 so that the high temperature cooling circuit 11 of the cooling system 10 can be vented via a venting device 30 of the cooling water compensation tank 21.

According to the dashed arrows of FIG. 1, air 22, 23 can be supplied from the drive assembly 13 and from the respective high temperature cooler 17 via a valve 24 to the cooling water compensation tank 21 to vent the high temperature cooling circuit 11.

The low temperature cooling circuit 12 of the cooling system 10 is not assigned a separate cooling water compensation tank. On the contrary, the cooling water compensation tank 21 interacts with both cooling circuits 11, 12 of the cooling system 10.

To permit the venting of the low temperature cooling circuit 12 via the cooling water compensation tank 21 of the high temperature cooling circuit 11, the high temperature cooling circuit 11 and the low temperature cooling circuit 12 are coupled via a coupling line 25, into which a nonreturn valve 26 is connected. The nonreturn valve 26 is either opened or closed depending on the pressure ratio between the pressure in the low temperature cooling circuit 12 and the pressure in the high temperature cooling circuit 11, wherein the pressure ratio between the high temperature cooling circuit 11 and the low temperature cooling circuit 12 is dependent on the rotational speed of the high temperature cooling circuit pump 15, the rotational speed of the exhaust gas turbocharger after run pump 16 and the rotational speed of the low temperature cooling water pump 20.

The low temperature cooling circuit 12 can be vented via the cooling water compensation tank 21 of the high temperature cooling circuit 11 only in defined, noncritical operating states of the vehicle, when the nonreturn valve 26 is open. By contrast, in critical operating states of the vehicle, the nonreturn valve 26 of the coupling line 25 is closed, and therefore the low temperature cooling circuit 12 cannot be vented in the critical operating states. In particular whenever the rotational speed of the high temperature cooling circuit pump 15, as a consequence of high rotational speeds of the drive assembly 13, and/or the rotational speed of the exhaust gas turbocharger after run pump 16 are/is greater than limit values, the pressure in the high temperature cooling circuit 11 is of such a magnitude that the nonreturn valve 26 of the coupling line 25 is kept closed so that no venting of the low temperature cooling circuit 12 is possible via the cooling water compensation tank 12 of the high temperature cooling circuit 11.

Whenever the rotational speed of the high temperature cooling circuit pump 15 and the rotational speed of the exhaust gas turbocharger after run pump 16 are lower than limit values, the nonreturn valve 26 of the coupling line 25 can be opened on the basis of the pressure ratio between the high temperature cooling circuit 11 and the low temperature cooling circuit 12 to permit the venting of the low temperature cooling circuit 12 in noncritical operating states of the vehicle.

As can be gathered from FIG. 1, a first end 27 of the coupling line 25 engages with the charge air cooler 19 of the low temperature cooling circuit 12, and an opposite second end 28 of the coupling line engages with the high temperature cooling circuit 11 downstream of the exhaust gas turbocharger after run pump 16.

Furthermore, FIG. 1 shows a nonreturn valve 29 that is connected between high temperature cooling circuit 11 and low temperature cooling circuit 12 and via which the two cooling water circuits can be filled from the cooling water collecting tank 21. However, this nonreturn valve 29 is not crucial to the invention.

The high temperature cooling water circuit 11 and the low temperature cooling water circuit 12 of cooling system 10 are vented via a common cooling water compensation tank 21. In critical operating states of the vehicle, the nonreturn valve 26 of the coupling line 25, via which high temperature cooling water circuit 11 and low temperature cooling water circuit 12 can be coupled, is closed.

The nonreturn valve 26 of the coupling line 25 then prevents cooling water of the high temperature cooling water circuit 11 from being able to pass into the low temperature cooling water circuit 12 and being able to heat same. When the nonreturn valve 26 is closed, the two cooling water circuits 11, 12 are decoupled thermally. This is the case whenever the pressure level of the high temperature cooling water circuit 11 is higher than the pressure level of the low temperature cooling water circuit 12.

The nonreturn valve 26 of the coupling line 25 can be opened to vent the low temperature cooling water circuit 12, if the pressure level in the high temperature cooling water circuit 11 drops, for example in the event of a low rotational speed of the high temperature cooling water pump 15 and low rotational speed of the exhaust gas turbocharger after run pump 16. In this case, cooling water of the low temperature cooling water circuit 12 can then flow into the high temperature cooling water circuit 11. However, this takes place only at noncritical operating points of the vehicle.

Accordingly, the high temperature cooling water circuit 11 can be vented at any time via the cooling water compensation tank 21. The low temperature cooling circuit 12 is vented into the high temperature cooling circuit 11 only when the nonreturn valve 26 of the coupling line 25 is open. Accordingly, the nonreturn valve 26 of the coupling line 25 permits the cooling water to flow out of the low temperature cooling circuit 12 into the high temperature cooling circuit 11 depending on the operating state of the vehicle. However, the nonreturn valve 26 of the coupling line 25 prevents cooling water from flowing out of the high temperature cooling circuit 11 into the low temperature cooling circuit 12.

What is claimed is:

1. A cooling system for a vehicle that has a drive assembly and an exhaust gas turbocharger, comprising:
    a high temperature cooling circuit including at least one pump, the drive assembly, and the exhaust gas turbocharger, the at least one pump being configured to circulate a high temperature cooling water to the drive assembly and to the exhaust gas turbocharger;
    a low temperature cooling circuit including a charge air cooler and at least one low temperature cooler, the at least one low temperature cooler having a low temperature coolant of the low temperature cooling circuit circulating therethough and exchanging heat with air, a low temperature cooling water pump configured to circulate the low temperature cooling water and being positioned between the at least one low temperature cooler and the charge air cooler; and
    a coupling line coupling the high temperature cooling circuit and the low temperature cooling circuit, where a first end of the coupling line is connected at the charge air cooler, the coupling line having a nonreturn valve that is opened or closed depending on a pressure ratio between the high temperature cooling circuit and the low temperature cooling circuit;
    wherein the high temperature cooling circuit is connected to a cooling water compensation tank that has a venting device so that the high temperature cooling circuit can be vented at the cooling water compensation tank, and the nonreturn valve connecting the low temperature cooling circuit to the high temperature cooling circuit so that the cooling water can be vented into flow through the high temperature cooling circuit and to the cooling water compensation tank for venting through the venting device of the cooling water compensation tank only in defined operating states when the nonreturn valve of the coupling line is open.

2. The cooling system of claim 1, wherein the high temperature cooling circuit further comprises at least one high temperature cooler, the at least one high temperature cooler having the high temperature cooling water of the high temperature cooling circuit circulating therethough and exchanging heat with air, the at least one pump includes a high temperature cooling water pump and an exhaust gas turbocharger after run pump for selectively delivering the high temperature cooling water to the drive assembly and the exhaust gas turbocharger.

3. The cooling system of claim 2, wherein a second end of the coupling line is connected to the high temperature cooling circuit between an inlet of the exhaust gas turbocharger and a discharge of the exhaust gas turbocharger after run pump.

4. The cooling system of claim 2, wherein the nonreturn valve of the coupling line is closed whenever a rotational speed of the high temperature cooling water pump or a rotational speed of the exhaust gas turbocharger after run pump exceeds a respective limit value.

5. The cooling system of claim 2, wherein the nonreturn valve of the coupling line is opened to vent the low temperature cooling circuit whenever the rotational speed of the high temperature cooling water pump and/or the rotational speed of the exhaust gas turbocharger after run pump is lower than a respective limit value.

\* \* \* \* \*